(12) United States Patent
Lango et al.

(10) Patent No.: US 7,412,531 B1
(45) Date of Patent: Aug. 12, 2008

(54) LIVE STREAM ARCHIVING METHOD AND APPARATUS

(75) Inventors: Jason Lango, Mountain View, CA (US); Robert Tsai, Atlanta, GA (US); Stephen Wu, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 781 days.

(21) Appl. No.: 10/060,416

(22) Filed: Jan. 29, 2002

(51) Int. Cl.
*G06F 15/16* (2006.01)
*G06F 12/00* (2006.01)

(52) U.S. Cl. ...................... 709/231; 711/113

(58) Field of Classification Search ................. 709/231, 709/232; 725/86, 87, 89; 711/113, 118, 711/133
See application file for complete search history.

(56) References Cited

U.S. PATENT DOCUMENTS

| | | |
|---|---|---|
| 5,043,885 A | 8/1991 | Robinson |
| 5,586,264 A | 12/1996 | Belknap et al. |
| 5,615,362 A | 3/1997 | Jensen et al. |
| 5,737,747 A | 4/1998 | Vishlitzky et al. |
| 5,799,185 A | 8/1998 | Watanabe |
| 5,854,887 A | 12/1998 | Kindell et al. |
| 5,918,020 A | 6/1999 | Blackard et al. |
| 5,960,452 A | 9/1999 | Chi |
| 6,085,193 A | 7/2000 | Malkin et al. |
| 6,351,471 B1 | 2/2002 | Robinett et al. |
| 6,351,474 B1 | 2/2002 | Robinett et al. |
| 6,366,970 B1 | 4/2002 | Wolff et al. |
| 6,405,256 B1 * | 6/2002 | Lin et al. .................... 709/231 |
| 6,407,680 B1 | 6/2002 | Lai et al. |
| 6,463,508 B1 * | 10/2002 | Wolf et al. .................. 711/133 |
| 6,484,212 B1 | 11/2002 | Markowitz et al. |
| 6,505,169 B1 | 1/2003 | Bhagavath et al. |
| 6,516,361 B2 | 2/2003 | Lym et al. |
| 6,564,380 B1 * | 5/2003 | Murphy ....................... 725/86 |
| 6,571,391 B1 * | 5/2003 | Acharya et al. ............... 725/87 |
| 6,593,860 B2 | 7/2003 | Lai et al. |
| 6,594,751 B1 | 7/2003 | Leivent |
| 6,651,103 B1 * | 11/2003 | Markowitz et al. .......... 709/231 |
| 6,665,755 B2 | 12/2003 | Modelski et al. |
| 6,708,213 B1 | 3/2004 | Bommaiah et al. |

(Continued)

OTHER PUBLICATIONS

NetCache™ 5.1 Web Cache First-Time Configuration Guide, Network Appliance, Inc., Sunnyvale, California, Apr. 2001.

(Continued)

*Primary Examiner*—William C. Vaughn, Jr.
*Assistant Examiner*—Yemane Mesfin
(74) *Attorney, Agent, or Firm*—Sonnenschein, Nath & Rosenthal LLP (57) ABSTRACT

A method for recording a complete stream of live data packets from a server in a media cache with reduced server-cache bandwidth includes utilizing a first amount of server-cache bandwidth to receive only a portion of the complete stream of live data packets from the server, determining when the stream of live data packets from the server finishes, thereafter utilizing a second amount of server-cache bandwidth to receive missing portions of the complete stream of live data packets, and combining the portion of the complete stream of live data packets and the missing portions of the complete stream of live data packets to form the complete stream of live data packets in the memory.

12 Claims, 7 Drawing Sheets

U.S. PATENT DOCUMENTS

| | | | |
|---|---|---|---|
| 6,721,850 B2 * | 4/2004 | Hofmann et al. | 711/133 |
| 6,742,082 B1 * | 5/2004 | Lango et al. | 711/118 |
| 6,744,763 B1 | 6/2004 | Jones et al. | |
| 6,747,991 B1 | 6/2004 | Hemy et al. | |
| 6,751,673 B2 * | 6/2004 | Shaw | 709/231 |
| 6,760,765 B1 | 7/2004 | Asai et al. | |
| 6,813,690 B1 * | 11/2004 | Lango et al. | 711/118 |
| 6,868,452 B1 * | 3/2005 | Eager et al. | 709/231 |
| 2001/0003193 A1 | 6/2001 | Woodring et al. | |
| 2001/0034786 A1 | 10/2001 | Baumeister et al. | |
| 2002/0029282 A1 | 3/2002 | Buddhikot et al. | |
| 2002/0049977 A1 * | 4/2002 | Miller et al. | 725/82 |
| 2002/0078219 A1 * | 6/2002 | Tate et al. | 709/231 |
| 2002/0097750 A1 | 7/2002 | Gunaseelan et al. | |
| 2002/0116473 A1 | 8/2002 | Gemmell | |
| 2002/0116585 A1 | 8/2002 | Scherr | |
| 2002/0133827 A1 * | 9/2002 | Newnam et al. | 725/89 |
| 2002/0162047 A1 | 10/2002 | Peters et al. | |
| 2002/0181506 A1 * | 12/2002 | Loguinov | 370/473 |
| 2003/0055910 A1 * | 3/2003 | Amini et al. | 709/214 |
| 2003/0217113 A1 | 11/2003 | Katz et al. | |
| 2004/0039837 A1 | 2/2004 | Gupta et al. | |

OTHER PUBLICATIONS

NetCache™ 5.1 Routine Administration Guide, Network Appliance, Inc., Sunnyvale, California, Apr. 2001.

NetCache™ 5.1 Configuration Guide, Network Appliance, Inc., Sunnyvale, California, Apr. 2001.

NetCache™ 5.1 Deployment Planning Guide, Network Appliance, Inc., Sunnyvale, California, Apr. 2001.

NetCache™ 5.1 Features and Configuration Planning Guide, Network Appliance, Inc., Sunnyvale, California, Apr. 2001.

NetCache™ 5.1 Streaming Media Cache First-Time Configuration Guide, Network Appliance, Inc., Sunnyvale, California, Apr. 2001.

NetCache™ Accelerator First-Time Configuration Guide, Network Appliance, Inc., Sunnyvale, California, Apr. 2001.

* cited by examiner

LIVE STREAM ARCHIVING METHOD AND APPARATUS

CROSS-REFERENCE TO RELATED APPLICATIONS

The present invention disclosure incorporates by reference for all purposes co-pending U.S. patent application Ser. No. 09/981,328, filed Oct. 16, 2001 and co-pending U.S. patent application Ser. No. 09/981,667, filed Oct. 16, 2001.

BACKGROUND OF THE INVENTION

The present invention relates to data caching. More particularly, the present invention relates to methods and apparatus for caching and serving streaming media with reduced server-cache bandwidth consumption and increased performance.

A variety of approaches have previously been used to deliver live streaming media data to multiple client systems at the same time. One technique for broadcasting streaming media to multiple clients is known as a Unicast broadcast model. This technique can be used without requiring special hardware and software, but consumes costly server bandwidth. This is because the server has to deliver multiple copies of the same data stream for multiple clients. As example, if the server supports K client systems and if a stream of data to a client system consumes bandwidth B, the server would consume B*K bandwidth.

Another technique for broadcasting live streaming media data to multiple client systems was a "Multicast" model. This techniques requires the use of an intermediary router and software between the server and the client systems. In this case, when more than one client requests the same stream of data, the intermediary router receives a stream from the server, replicates the streaming media data for each client system, and outputs the stream to each client. In contrast to the above model, the server consumes bandwidth B for broadcasting the stream to the intermediary router.

Drawbacks to the above models include that any request for the streaming media data from clients at a later time would again require the server to provide the streaming media data bandwidth. For example, if a client system subsequently requested a copy of the streaming media data, such as a rebroadcast of a "live" press conference, the server would again have to use bandwidth B to provide the streaming media data to the client. The additional bandwidth B therefore would be used for the rebroadcast whether or not the Unicast or Multicast model were used.

A general method to reduce bandwidth consumed between servers and clients for repeated data requests used hardware known as file caches. These file caches typically included a hard disk for receiving files from file servers, and for storing entire files. When a client desired a file, instead of serving the file from the file server, the file is served from the file cache. Because the cache was typically a server that was closer to the client or has higher bandwidth than the file server, the file would be served to the client quickly from the cache.

It was discovered by the inventors, that attempting to apply typical file caching methods to files that include streaming media data, raised many significant problems. For instance, serving a streaming media data file from a cache required much more processing by the cache than with classical file transfers over the web. Further, another drawback was that because streaming media data files were very large, a huge penalty was incurred if the streaming media data file was deleted. Another drawback was that many different streaming media formats existed, each with its own specific streaming requirements. Accordingly, typical file caches were not suited to store streaming media data.

Pioneering systems and methods to attempt to reduce the amount of bandwidth used by a server to stream media data were developed by the assignee of the present invention. These systems included the use of novel caching techniques for storing streaming media data as described in the co-pending application cited.

Thus in light of the above, what is required are improved methods and apparatus for storing and serving streaming media data within a cache with reduced bandwidth requirements. Further, what is required are methods and apparatus for providing such solutions in economical ways.

BRIEF SUMMARY OF THE INVENTION

The present invention relates to data caching. More particularly, the present invention relates to apparatus for caching and serving live streaming media with reduced server-cache bandwidth consumption.

Embodiments of the present invention may be used to provide live streaming data to multiple clients, while at the same time storing a "complete" copy of the streaming data for later re-broadcast. The live streaming data may be scheduled (e.g. weekly press conferences) or on unscheduled (e.g. breaking news stories). Because of a variety of factors, the streaming media data is seldom captured "live" in its entirety. Embodiments are therefore used to capture as much "live" streaming media data as possible, and thereafter to load the missing portions of the "live" streaming media data from the server. The portions that are often discovered to be missing are the beginning portions of the streaming media data, (e.g. first few minutes). Once the missing parts are stored, the streaming data would be "complete."

In the present disclosure "Streaming media" data (also data stream, stream, or the like) generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

According to one aspect of the invention, a method for recording streaming media in a cache is disclosed. The streaming media includes chronologically ordered packets including a first set of packets followed by a second set of packets. The method may include the steps of requesting a first copy of the streaming media from a server, receiving the second set of packets of the streaming media from the server in response to the request, providing the second set of packets of the streaming media to a client, and storing the second set of packets in the cache. Subsequently the following steps may be performed including requesting a second copy of the streaming media from the server, receiving the first set of packets from the streaming media from the server, and storing the first set of packets in the cache. The request for the second copy of the streaming media may be terminated after storing the first set of packets.

According to another aspect of the invention, a streaming media cache is described. The cache may include a first process configured to request data packets of data stream from a server beginning with a currently available data packet from the server, and a second process configured to receive a first set of data packets from the server, the first set data packets including the currently available data packet. Additionally, the cache may include a third process configured to store the first set of data packets in a memory. The first process may also be configured to request data packets of the data stream from the server, beginning with a first data packet from the data stream after the first set of data packets is received from the server. The second process may also be configured to receive a second set of data packets from the server, the second set of data packets including the first data packet. Additionally, the third process may also be configured to store the second set of data packets in the memory.

According to yet another aspect of the invention, a method for recording a complete stream of live data packets from a server in a media cache with reduced server-cache bandwidth is described. One technique may include the steps of utilizing a first amount of server-cache bandwidth to receive only a portion of the complete stream of live data packets from the server, and determining when the stream of live data packets from the server finishes. The technique may also include the steps of utilizing a second amount of server-cache bandwidth to receive missing portions of the complete stream of live data packets, and combining the portion of the complete stream of live data packets and the missing portions of the complete stream of live data packets to form the complete stream of live data packets in the memory.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
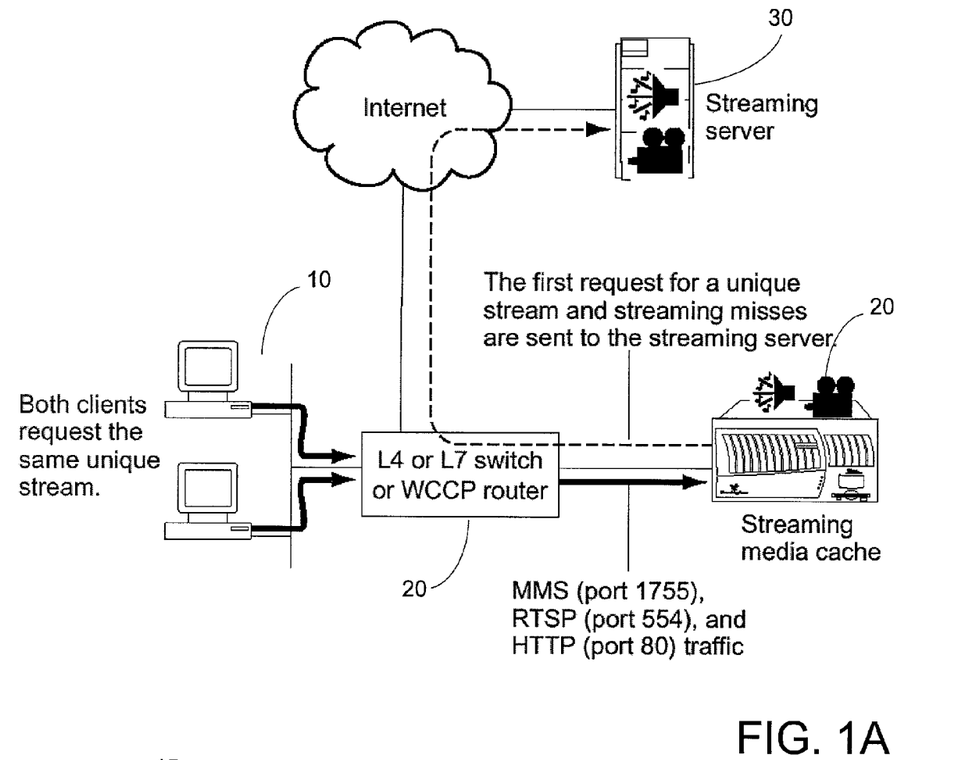
FIGS. 1A-C illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media.

If such a request is determined by router 40, that request is redirected to streaming media cache 20, and not media data server 30. Once streaming media cache 20 receives the request, it makes a determination whether the stream (the entire media clip) or the requested portion of the stream (the request portion of the media clip) has already been cached. If the data has been previously stored, streaming media cache 20 provides the streaming media to client system 10.

In the present embodiment, if the data (requested portion of a stream) has not previously been stored in streaming media cache 20, as when the data is "live" data, streaming media cache 20 sends a request to media server 30 for the live stream of data. As the live stream of data is delivered to streaming media cache 20, it is forwarded to client system 10, and the portion of the stream of data is stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
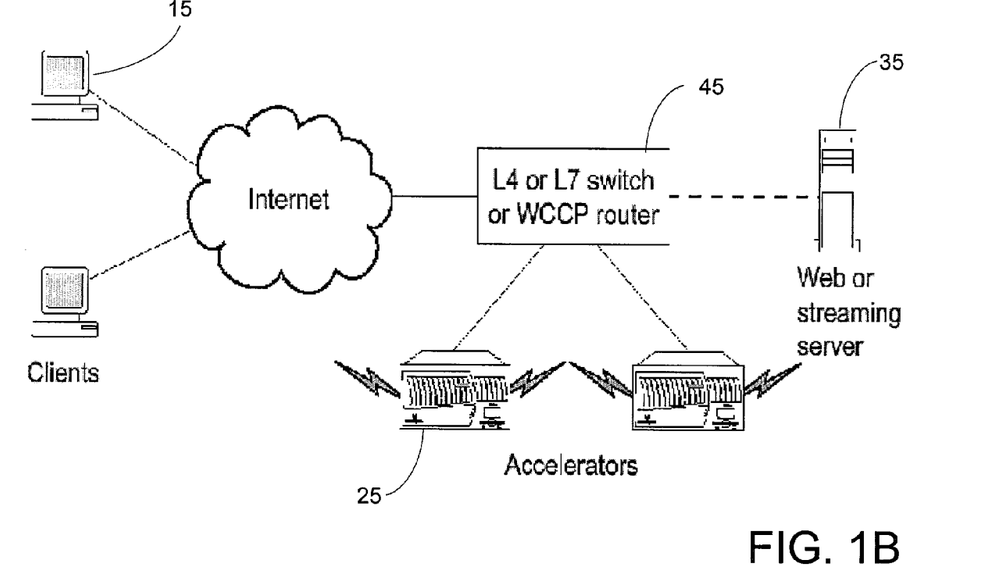

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache (server) 25, media data server 35 (streaming server), and a router 42. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 42. Router 42 may be embodied as a layer 4 or layer 7 switch, a WCCP router, or any other conventional switch or router. In this embodiments, router 42 would be configured to recognize when a request is made by client system 10 for a stream of streaming media.

If such a request is determined by router 42, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 10.

In the present embodiment, if the data has is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail below.

For this embodiment, the streaming media traffic is sent by media cache 20 to specific ports. In specific embodiments, for RealSystem streaming media, media cache 20 sends streaming media via TCP on port 554; for QuickTime (RTSP) streaming media, media cache 20 sends streaming media via TCP on port 554 and/or via UDP on port 2001; for Microsoft Media Streaming (MMS) streaming media, media cache 20 sends streaming media data via TCP on port 1755; and for HTTP streaming media, media cache 20 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 1C:
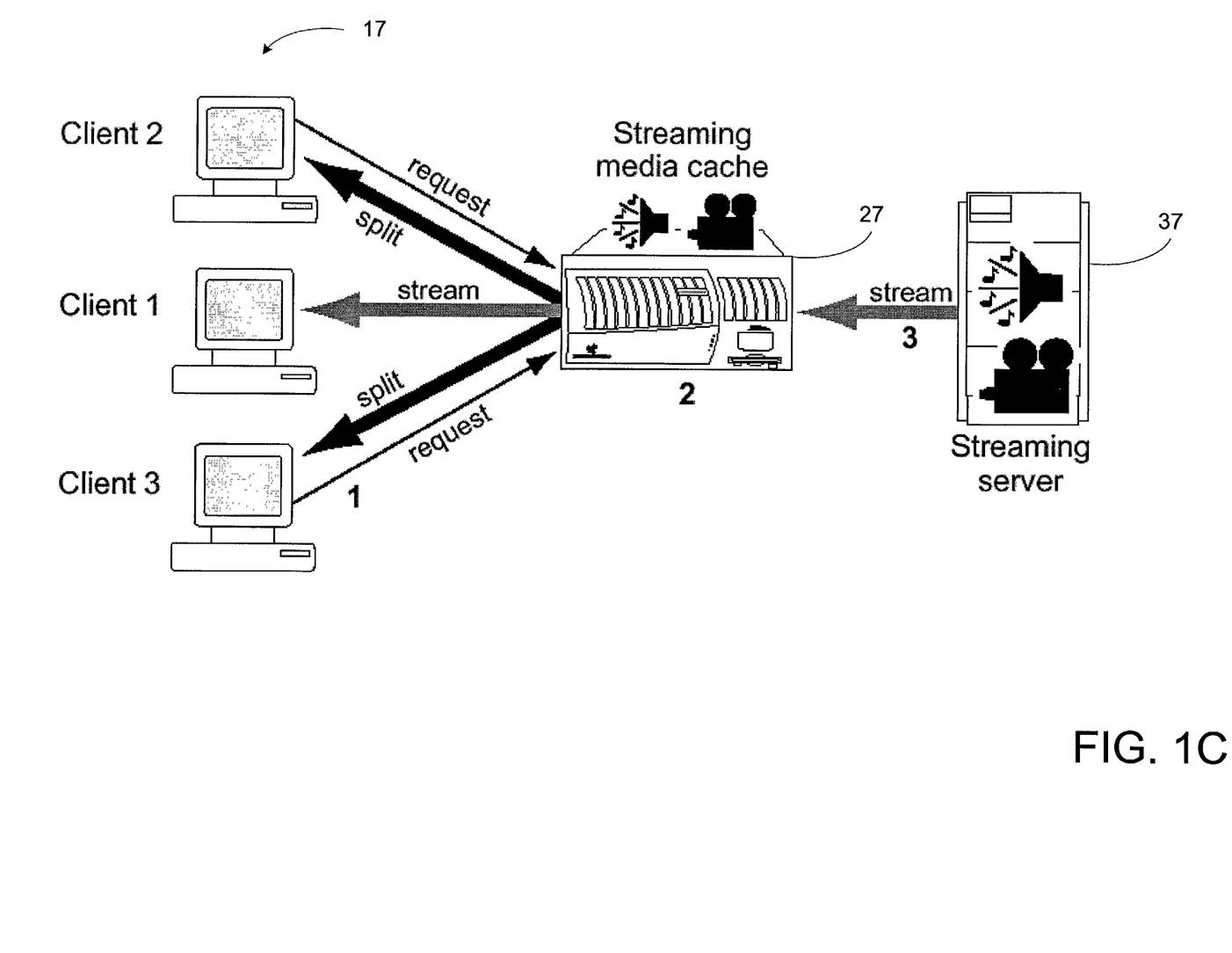

FIG. 1C illustrates another embodiment of the present embodiment. In particular, FIG. 1C illustrates an embodiment where a "live" stream of data is delivered to multiple client systems. FIG. 1C illustrates a streaming media server 37, a streaming media cache 27, and a series of client systems 17.

In this embodiment, streaming media cache 27 is used to provide "live" streaming media data received from streaming media server 37, or the like, to client systems 17. It should be understood that streaming media server 37 may itself be an "upstream" streaming media cache, or other source of "live" streaming media data.

In these embodiments "live" data may be real-time data, such as a audio and/or video webcast of a live performance. In other embodiments "live" data may be data that is to be a controlled or "coordinated" webcast at a particular time, even though the data is pre-recorded. For example, the "live" data may represent a time-shifted event, a pay-per-view event, a scheduled program, or the like. As examples, "live" data streams may represent a world-wide corporate press release, a full-length movie, a censor-delayed webcast, and the like. Accordingly, "live" data streams in these embodiments refer to data streams that are to be substantially simultaneously delivered to multiple client systems.

As illustrated in FIG. 1C, a first client system may be receiving the live stream of data via streaming media cache 27. Later, a second and third client systems may request the same live stream of data. In this case, in response to the second and third client requests, the live stream that the first client is being sent, is split and sent to the second and third clients. Thus, if the second and/or third requests are made 10 minutes after the live stream of data starts, the second and third clients miss the first 10 minutes, and begin receiving the live stream at that point (e.g. 10 minutes into the stream).

In the present embodiments, streaming media cache 27 may be a cache such as cache 25 on the "edge" of a POP network as illustrated in FIG. 1B or a local cache such as cache 20 illustrated in FIG. 1A. In such embodiments, cache 27 provides "live" streaming media data to client systems 17, cache 27 stores the "live" streaming media data and cache 27 rebroadcasts the streaming media data to client systems 17 at a later time. For example, streaming media cache 27 streams a live press conference to client systems 17 and at the same time stores it in local disk memory. At a later time or date, when a user at a client system wishes to view or hear the press conference as was originally broadcast. Streaming media cache 27 retrieves the locally cached copy of the press conference and streams it to the user. Efficient methods for implementing such functionality will be described below.

Figure 2:
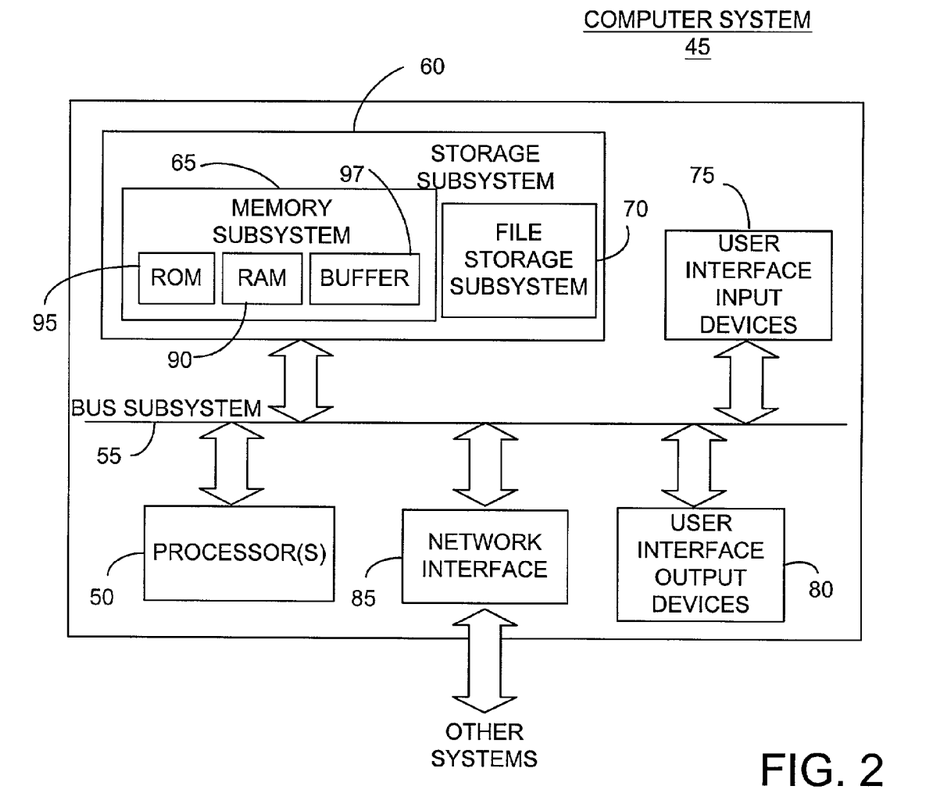
FIG. 2 is a simplified block diagram of a computer system according to an embodiment of the present invention.

FIG. 2 is a simplified block diagram of a computer system 45 according to an embodiment of the present invention. Computer system 45 may be used as client system 10, streaming media cache 20, and/or media data server system 30. Computer system 45 may be a stand-alone computer system, a computer "appliance," or the like.

As shown in FIG. 2, computer system 45 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 45. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 50.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 45.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor(s) 50 of computer system 45. In a distributed environment, the software modules may be stored on a plurality of computer systems and executed by processors of the plurality of computer systems. Storage subsystem 60 may also provide a repository for storing various databases that may be used to store information such as a cache entry hash table discussed in the co-pending application. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. The type of data may include streaming media payload data.

In the present embodiment, computer system 45 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 45 communicate with each other as intended. The various subsystems and components of computer system 45 need not be at the same physical location but may be distributed at various locations within a network. Although bus subsystem 55 is shown schematically as a single bus, alternative embodiments of the bus subsystem may utilize multiple busses.

Computer system 45 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 45 depicted in FIG. 2 is intended only as a specific example for purposes of illustrating an embodiment of the computer system.

In one embodiment, computer system 45 is embodied as a network cache (appliance) in a product called "NetCache" available from NetworkAppliance, Incorporated. The Net-Cache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 2.

Figure 3:
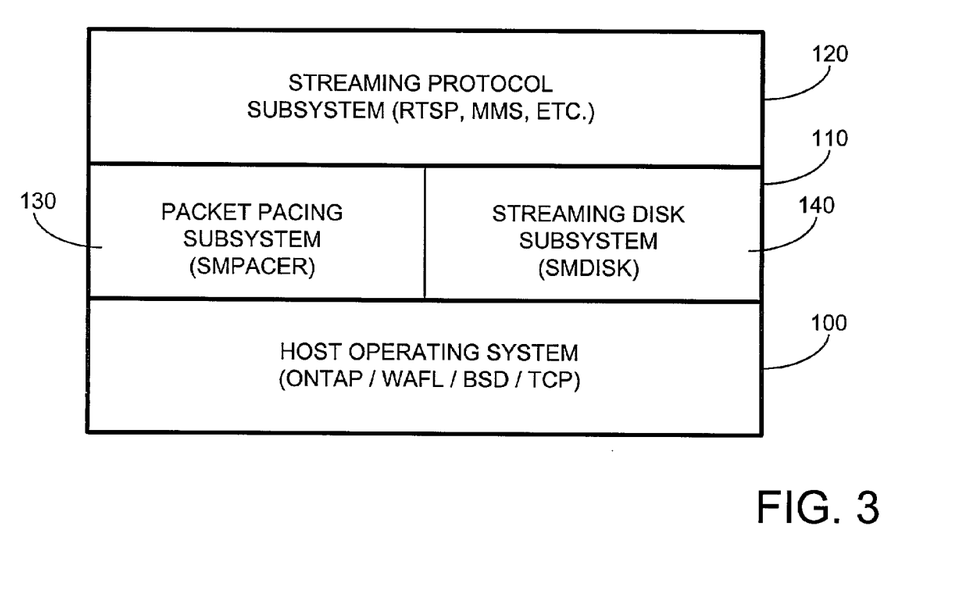
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, as illustrated, operating system level (layer) 100 includes portions of the Berkeley Software Distribution (BSD) operating system. Additionally, operating system level 100 includes software provided by the assignee of the present invention: Data ONTAP™, a Network Appliance brand operating system with Write Anywhere File Layout (WAFL™), a Network Appliance brand file system. In the present embodiment, the Data ONTAP™ operating system provides efficient file service by using file-system technology and a microkernel design geared towards network data access. The WAFL™ file system provides efficient file storage and retrieval based upon efficient access algorithms and data structures. Additionally, network communications using Transmission Control Protocol (TCP) and UDP are also supported at operating system level 100. Of course other types of operating systems can also be used.

As illustrated in FIG. 3, data handling level (layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. In one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level (layer) 120. Protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjust the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of the software architecture can be found in the application incorporated by reference, above.

Figure 4A:
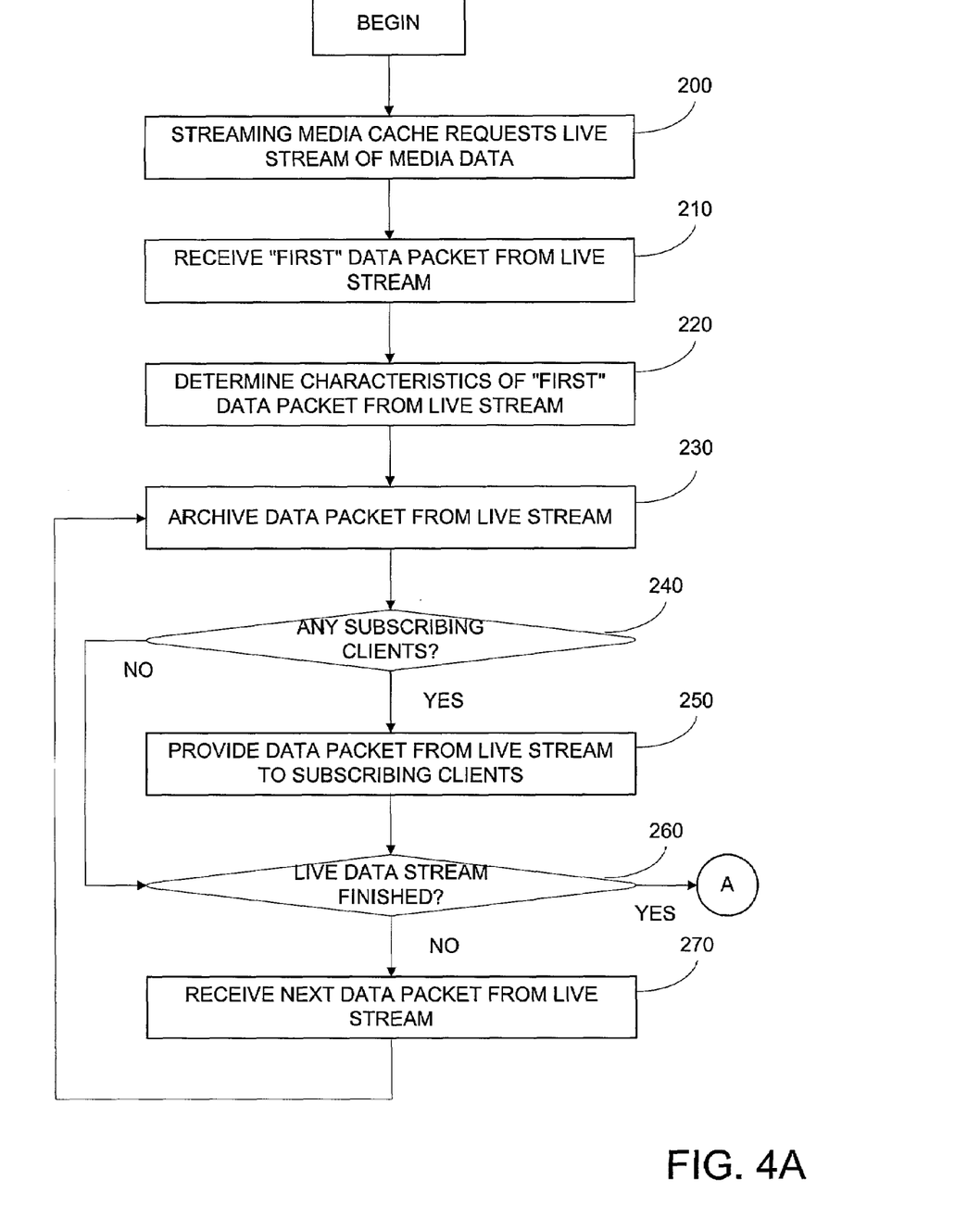
FIGS. 4A-C illustrate a data format hierarchy according to an embodiment of the present invention.
Figure 4B:
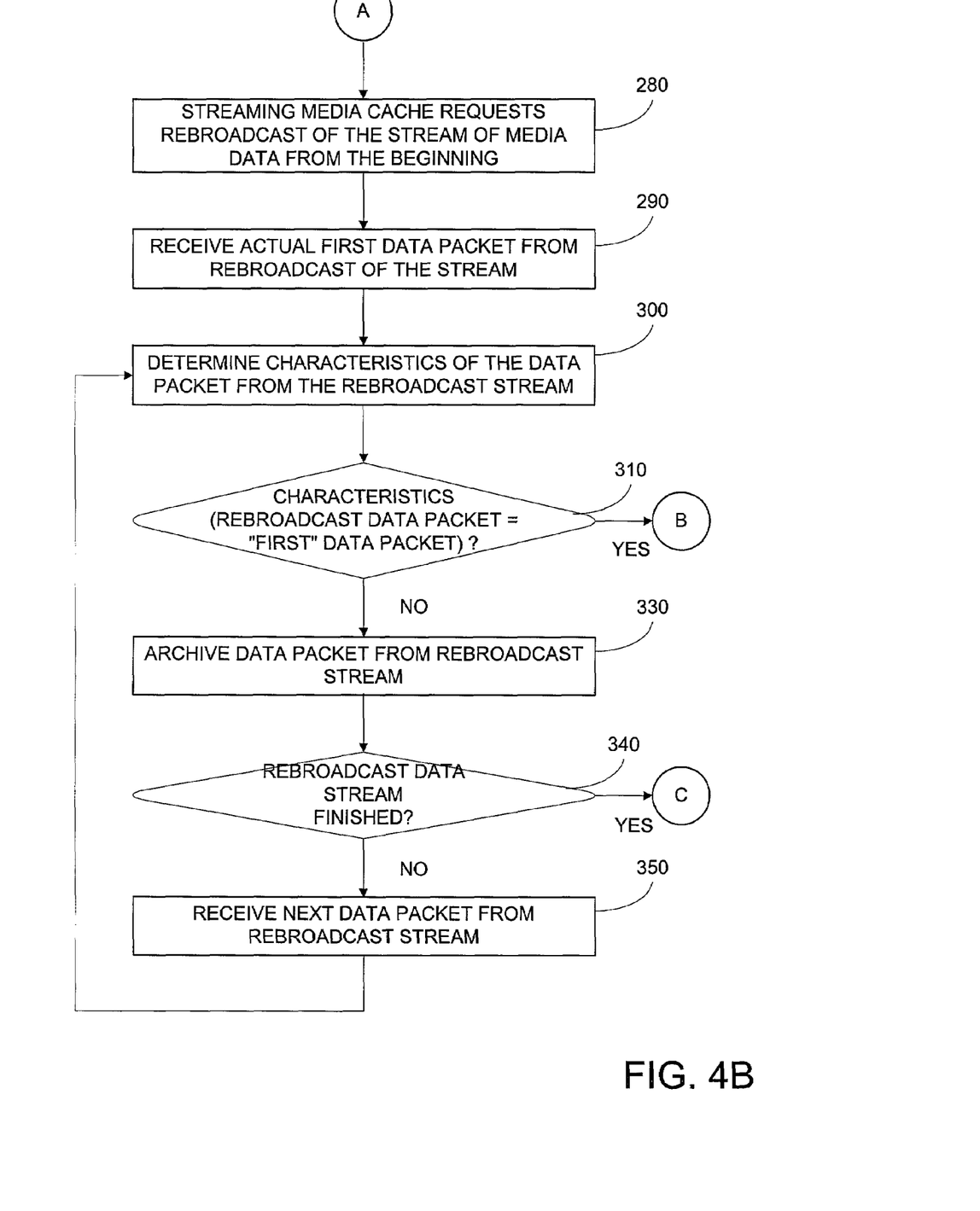
Figure 4C:
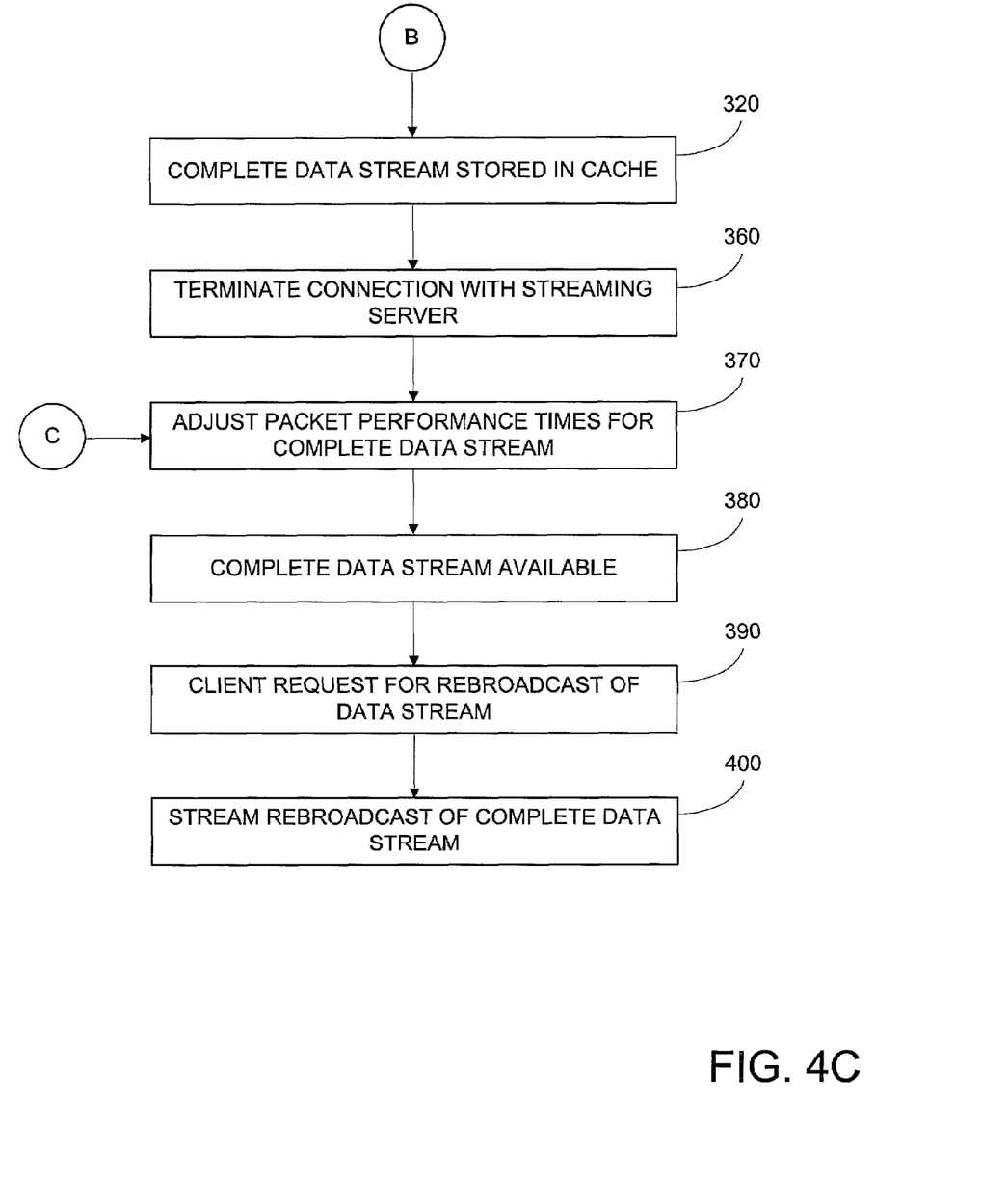

FIGS. 4A-C illustrates a block diagram of a flow chart according to an embodiment of the present invention. More particularly, FIGS. 4A-C illustrates a process of storing complete streams of streaming media data into embodiments of the present invention.

Initially, streaming media cache 27 requests a "live" stream of media data from streaming media server 37, step 200. In various embodiments, streaming media cache 27 may request the stream according to a predetermined time schedule. For example, streaming media cache 27 may request a web cast of a morning business report at 9 AM every business day. In another embodiment, streaming media cache 27 may request the stream per request from a client system 17. For example, a user at a client system 17 may request a webcast of a speech by The President of The United States. In various embodiments, streaming media cache 27 typically requests the stream by specifying a URL, or the like.

In response, to the stream request, streaming media cache 27 begins receiving the "live" streaming media data from streaming server 37, step 210. Because such data streams are "live" the first data packet received by streaming media cache 27 may or may not be the actual first data packet in the complete data stream. For example, streaming media cache 27 may request and receive "live" data of a media stream five minutes after the broadcast began, or the like. As will be described further below, these first received data packets are treated by streaming media cache 27 as the beginning of the data stream, until the stream is made "complete."

In this embodiment, characteristics of the first data packet received are determined and stored in streaming media cache 27, step 220. In other embodiments, characteristics of more than just the first data packet received is stored. For example, characteristics of the first ten data packets or first fifty data packets received are stored. In this embodiment, the characteristics may include numeric values of the data packets, derived values, or the like.

As will be discussed below, the characteristics of the first data packet will be used to help make the stream "complete."

Next, the data packets received from streaming server 37 are stored in cache disk memory, step 230. In the present embodiment, efficient techniques described in the above cited patent applications are used to store the data packets. In other embodiments, other techniques for storing streaming media data may also be used.

In this embodiment, if a client system 17 is subscribed to the media stream, step 240, the received data packet is output to client system 17, step 250. If more than one client system 17 are subscribed to the data stream, per-client modifications to the data packets such as techniques described in the cited patent applications can be used to reduce peak output traffic bursts.

Next, a determination is made as to whether the "live" stream has finished, step 260. Various methods for determining this condition may be used, for example, when streaming server 37 returns an error condition, or the like. If the stream has not completed, streaming media cache 27 receives the next data packet in the media stream from streaming server 37, step 270. The process then repeats, as illustrated.

In the present embodiment, if the media stream has finished, streaming media cache 27 then attempts to "complete" the media stream. As was mentioned above, the beginning of the media stream may have been cut-off for various reasons including that the media stream began before streaming media cache 27 began recording the stream. In such a case, streaming media cache 27 "completes" the stream by obtaining missing portions of the stream as will be described below.

In this embodiment, after the "live" media stream finishes, streaming media cache 27 requests streaming server 37 to provide a rebroadcast of the media stream from the actual beginning of the media stream, step 280. Embodiments may perform this by specifying the same URL used in step 200 above, or by specifying a different URL.

In response, to this stream request, streaming media cache 27 receives the actual starting or beginning data packet of the rebroadcast from streaming server 37, step 290. In this embodiment, the starting data packet should be the "true" first data packet of the streaming media data.

Next, characteristics of the rebroadcast data packet from streaming server 37 are determined, step 300. The characteristics of this rebroadcast data packet are then compared to the characteristics of the "first" live data packet, determined in step 220, step 310.

In the present embodiment, if the characteristics match, streaming media cache 27 determines that this rebroadcast data packet has already been stored on local disk, and that the streaming media data is "complete," step 320. In other embodiments, characteristics of more than just the first data packet are used for comparison purposes. For example, characteristics of the first five, ten data packets received from the "live" data stream and the rebroadcast data stream may be used for comparison purposes. In this embodiment, the characteristics may include numeric values, or the like.

If the characteristics do not match, the data packet from the rebroadcast data stream is stored in cache disk memory, step 330. In the present embodiment, efficient techniques described in the above cited patent applications are used. In other embodiments, other techniques for storing streaming media data may also be used.

Next, a determination is made as to whether the rebroadcast stream has finished, step 340. Various methods for determining this condition may be used, for example, when streaming server 37 returns an error condition, or the like. If the rebroadcast stream has not completed, streaming media cache 27 receives the next data packet in the rebroadcast media stream from streaming server 37, step 350. The process then repeats, as illustrated.

In this embodiment, if the data is "complete" within streaming media cache 27, step 320, the connection with streaming server 37 is terminated, step 360. In this embodiment, by terminating the request for the rebroadcast data stream early, i.e. before the entire stream is rebroadcast, the amount of data transferred by streaming server 37 is greatly reduced. An example of this will be illustrated in FIG. 5, below.

In the present embodiment, after all data packets of the complete data stream are stored, housekeeping is performed within streaming media cache 27, step 370. As was disclosed above, the first data packet from the "live" data stream was tentatively identified as the first data packet of the data stream. However, with the steps above, the "true" or actual first data packet of the data stream, and missing data packets of the data stream are stored. In the present embodiment, using the storage techniques described in the co-pending cited patent applications, housekeeping is performed to adjust the presentation times and other parameters of the complete data stream. For example, housekeeping may be used to indicate that the first data packet and other data packets from the "live" data stream are chronologically after the "true" first data packet and other data packets from the rebroadcast stream.

At this stage, it is contemplated that a copy of a complete data stream is stored within streaming media cache 27, step 380. Subsequently, if users at client systems 17 request a copy of the data stream, step 390, the data stream is served first from streaming media cache 27, step 400. In embodiments where portions of the data stream are ejected by streaming media cache 27, to free-up disk space, streaming media cache 27 contacts streaming server 37 for the missing portions.

Figure 5:
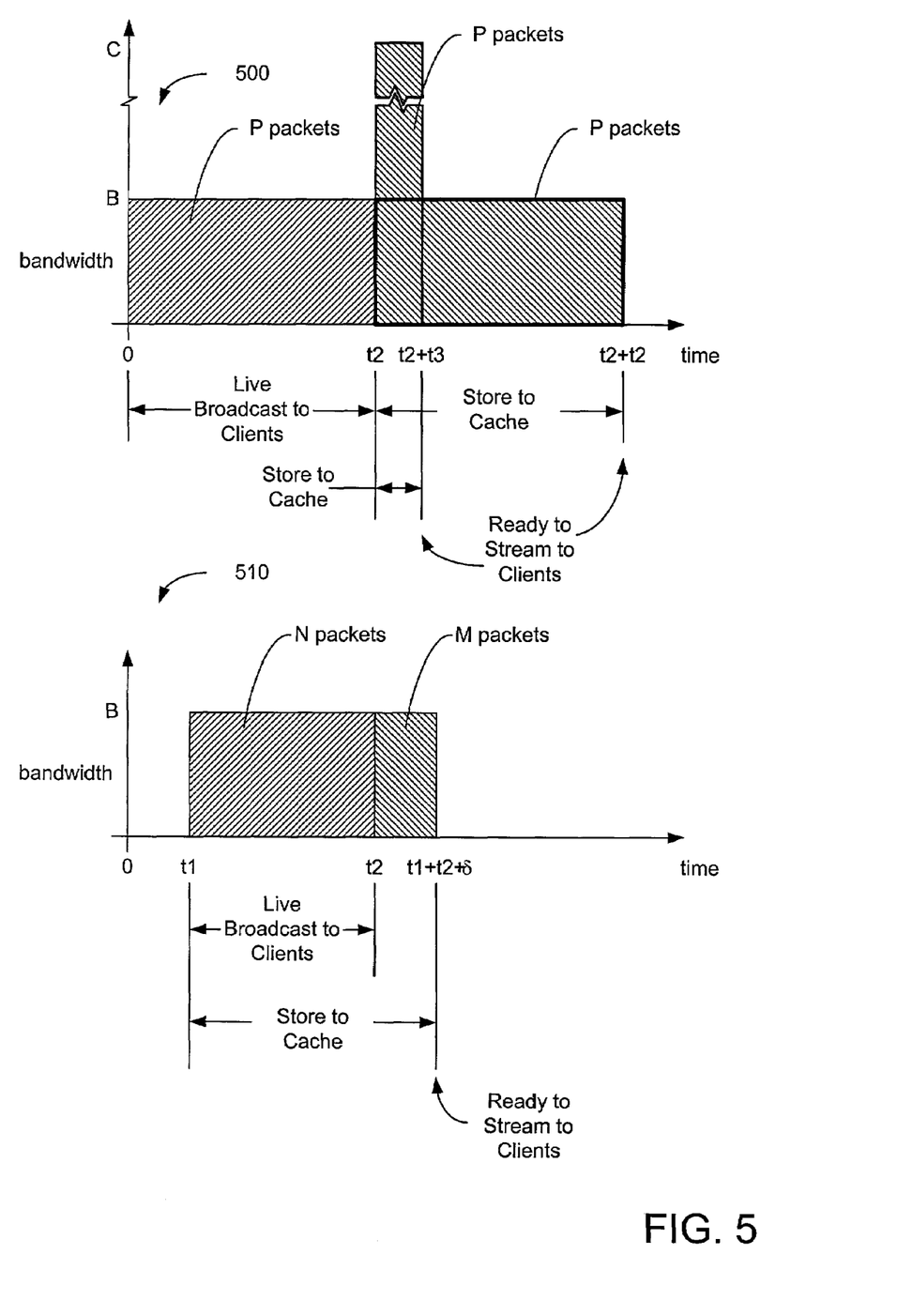
FIG. 5 illustrates an example according to an embodiment of the present invention.

FIG. 5 illustrates an example according to an embodiment of the present invention. In FIG. 5 timelines 500 and 510 are illustrated.

Time line 500 illustrates that it would take an amount of time t2 to transfer a live data stream at bandwidth B from streaming server 37 to streaming media cache 27. Time line 500 also illustrates that it would take approximately an amount of time t2 to transfer a rebroadcast data stream at bandwidth B from streaming server 37 to streaming media cache 27.

In this example, the number of packets transferred from streaming server 37 to streaming media cache 27 for each data stream is P. Accordingly, the actual amount of time to receive a live data stream and to record a copy of the data stream would take approximately t2+t2 amount of time. Further, the transfers would require the bandwidth B for t2+t2 amount of time, and would transfer 2*P number of packets.

Time line 510 illustrates an embodiment of the present invention. In this example, streaming media cache 27 begins requesting the live data stream at time t1. As was described above, the live data stream is typically recorded in streaming media cache 27 and may be provided to subscribing client systems at the same time.

As is illustrated, streaming server 37 uses bandwidth B for t2−t1 amount of time to record the remaining portion of the data stream. The number of packets transferred is N.

Next after the live stream is finished, at t2, streaming media cache 27 requests a recorded copy of the data stream from the beginning. As is illustrated for approximately the next t1 amount of time, streaming media cache 27 receives and stores the "missing" portion of the data stream. During this time, streaming server 37 uses bandwidth B for approximately t1 amount of time. The number of packets transferred is M.

Once streaming media cache 27 determines that the data stream is complete, the stream of data from streaming server 37 is stopped. Accordingly, after approximately t1+t2 amount of time, the complete data stream will have been downloaded and stored by streaming media cache 27.

As can be seen, comparing time line 500 to time line 510, t1+t2<=t2+t2. In more typical cases, t1+t2<t2+t2. Accordingly, streaming media cache 27 can begin providing streaming media data earlier to clients in the embodiment in time line 510 than in time line 500.

As illustrated in FIG. 5, using embodiments illustrated in time line 510, streaming server 37 uses bandwidth B for approximately t2 amount of time to transfer approximately N+M number of packets. As can be determined, the number of packets typically transferred is: N+M<2*P, where N+M>=P. In some embodiments P<N+M<P+P. Accordingly, the number of packets transferred from streaming server 37 using an embodiment in time line 510 are much less than in time line 500.

In an embodiment enabled by the patent applications incorporated by reference, a file including all packets can be downloaded into the streaming media cache. In some embodiments of the present invention, file-based transfer of the streaming media data is provided at a higher bandwidth than the bandwidth of real-time streaming of data. This embodiment is illustrated in time line 500. As illustrated, the file may be transferred at the bandwidth C for t3 amount of time. In various embodiments, the number of packets typically transferred is P packets, however the time t3 is typically much smaller than t2, i.e. t3<t2. Further, the time t3 may also be smaller than t1 in some cases (t3<t1). Accordingly, in some embodiments, the streaming media data may be ready to stream to clients sooner than in time line 510. However, the number of data packets totally transferred in time line 500 is still larger than in time line 510, i.e. P+P>N+M. Accordingly, the embodiment illustrated in time line 510 is desirable in many instances, including when the bandwidth from a media server is bandwidth limited.

In view of the above disclosure, many other variations can be envisioned. For example, different characteristics may be compared to determine if data packets are the same. As another example, more than one data packet are compared to each other to determine if data packets are the same, for example 15 packets in a row are compared at a time. In still other embodiments, combinations of the above are contemplated.

The invention has been described in embodiments above as a file cache or a streaming media cache. It should be understood, however, that, embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network (upstream servers) before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for recording streaming media in a cache, comprising:

requesting a live transmission of the streaming media from a server, the streaming media including chronologically ordered packets, a first set of said packets being chronologically earlier than a second set of said packets;

receiving, from the server and in response to the request for the live transmission, the second set of packets of the streaming media and designating at least a first packet of the second set of packets as an initial data packet;

providing the second set of packets of the streaming media to a client;

storing the second set of packets in the cache;

requesting a rebroadcast of the streaming media from the server;

receiving, from the server and in response to the request for the rebroadcast, the first set of packets of the streaming media;

determining whether at least a first data packet from the first set of data packets is the same as the initial data packet from the second set of data packets and, if so, terminating the request for the rebroadcast of the streaming media, otherwise storing the first set of data packets in the cache until a data packet from the first set of data packets is the same as the initial data packet from the second set of data packets, and terminating the request for rebroadcast of the streaming media, wherein P<N+M<2*P, where N represents a number of data packets in the second set of data packets; M represents a number of data packets in the first set of data packets; and P represents a number of data packets in a third set of data packets.

2. The method of claim 1 further comprising after terminating the request for the rebroadcast of the streaming media:

receiving a request from another client for a copy of the streaming media; and sending packets from the first set of packets to the other client before sending packets from the second set of packets to the other client.

3. The method of claim 1, wherein a streaming media protocol for the streaming media is selected from the group: Microsoft Media Streaming and Real Time Streaming Protocol.

4. The method of claim 1, wherein requesting the live transmission of the streaming media comprises requesting currently available packets of the streaming media from the server.

5. The method of claim 4, wherein the currently available packets are associated with presentation times later than a presentation time of an earliest packet of the streaming media.

6. The method of claim 4, wherein the live transmission of the streaming media comprises data packets from a live source.

7. A streaming media cache, comprising:

a processor coupled to a computer-readable storage device that stores computer-readable instructions for execution by the processor, which instructions, when implemented by the processor, cause the processor to perform:

a first process configured to request a live transmission of data packets of a data stream from a server, the live transmission beginning with a currently available data packet of the data stream;

a second process configured to receive a first set of data packets of the data stream from the server, the first set of data packets including the currently available data packet;

a third process configured to store the first set of data packets in a memory;

wherein the first process is also configured to request, from the server and after the first set of data packets is received, a rebroadcast of the data packets of the data stream, the rebroadcast beginning with a first data packet of the data stream, the first data packet having a presentation time chronologically earlier than a presentation time of the currently available data packet;

wherein the second process is also configured to receive a second set of data packets of the data stream from the server, the second set of data packets including the first data packet;

wherein the third process is also configured to store the second set of data packets in the memory by determining when a data packet from the second set of data packets is the same as the currently available data packet from the first set of data packets and terminating the request for the rebroadcast of the data packets of the data stream and to combine the first set of data packets and the second set of data packets to form a third set of data packets, the third set of data packets representing the data stream in the memory; and wherein P<N+M<2*P, where N represents a number of data packets in the first set of data packets; M represents a number of data packets in the second set of data packets; and P represents a number of data packets in a third set of data packets.

8. The streaming media cache of claim 7, further comprising:

a fourth process configured to provide the first set of data packets of the data stream to a client contemporaneously with the third process storing the first set of data packets in the memory.

9. The streaming media cache of claim 7, wherein the data packets are formatted in a format selected from the group: Microsoft Media Streaming and Real Time Streaming Protocol.

10. A method for reducing a complete stream of data packets of a live transmission from a server in a media cache with reduced server-cache bandwidth, comprising:

utilizing a first amount of server-cache bandwidth to receive a first portion of the complete stream of data packets of the live transmission from the server, the first portion of data packets being less than the complete stream of data packets of the live transmission and including an initial data packet as a first chronological data packet of the first portion of the complete stream of data packets;

determining when the stream of data packets from the server finishes; thereafter utilizing a second amount of server-cache bandwidth to receive missing portions of the complete stream of data packets, the missing portions including at least some data packets having presentation times chronologically earlier than data packets of the first portion of the complete stream, until a data packet from the missing portions of the complete stream is the same as the initial data packet from the first portion of the complete stream of data packets and thereafter stopping reception of the missing portions of the complete stream of data packets; and combining the data packets of the first portion of the complete stream of data packets and the data packets of the missing portions of the complete stream of data packets to form a stored copy of the complete stream of data packets in the memory, wherein P=<N+M<2*P, where P represents an amount of server-cache bandwidth required to provide the complete stream of data packets of the live transmission, M represents the first amount of server cache bandwidth, and N represents the second amount of server-cache bandwidth.

11. The method of claim 10, further comprising:

while utilizing the first amount of server-cache bandwidth to receive the first portion of the complete stream of data packets of the live transmission from the server, providing the first portion of the complete stream of data packets of the live transmission to a client.

12. The method of claim 10, further comprising:

after combining the data packets of the first portion of the complete stream of data packets and the data packets of the missing portions of the complete stream of data packets to form the stored copy of the complete stream of data packets, providing the stored copy of the complete stream of data packets from the memory to a client.

* * * * *